United States Patent [19]

Ogura

[11] 3,929,092
[45] Dec. 30, 1975

[54] SELECTOR LEVER POSITION INDICATOR FOR MOTOR VEHICLE AUTOMATIC TRANSMISSION SYSTEM

[75] Inventor: Hisateru Ogura, Yokohama, Japan

[73] Assignee: Nissan Motor Company Limited, Japan

[22] Filed: Apr. 26, 1974

[21] Appl. No.: 464,671

[30] Foreign Application Priority Data
May 8, 1973 Japan.............................. 48-53257

[52] U.S. Cl. ..................... 116/124 M; 116/DIG. 20
[51] Int. Cl.² ............................................ G09F 9/00
[58] Field of Search .. 116/124 R, 124 AT, DIG. 20; 74/473 R, 473 P; 240/2.1, 8.16

[56] References Cited
UNITED STATES PATENTS

| | | | |
|---|---|---|---|
| 3,231,857 | 1/1966 | Miller | 116/124 R |
| 3,292,450 | 12/1966 | Hurst et al. | 74/473 |
| 3,515,012 | 6/1970 | Adahan | 74/473 |
| 3,524,979 | 8/1970 | Cohen | 116/124 R |

*Primary Examiner*—Richard E. Aegerter
*Assistant Examiner*—John W. Shepperd
*Attorney, Agent, or Firm*—Robert E. Burns; Emmanuel J. Lobato; Bruce L. Adams

[57] ABSTRACT

A shift lever position indicator for a motor vehicle automatic transmission system, comprising a symmetric casing coupled with the shift lever and having at its upper wall patterned transparent portions representing the driving ranges, a slide and indicating member accommodated in the casing and being slidable beneath the patterned transparent portion in accordance with movement of the shift lever, and a light source positioned under the slide and indicating member, whereby one of the patterned portions corresponding to a selected driving range is brightened by preferred chromatic light rays.

1 Claim, 3 Drawing Figures

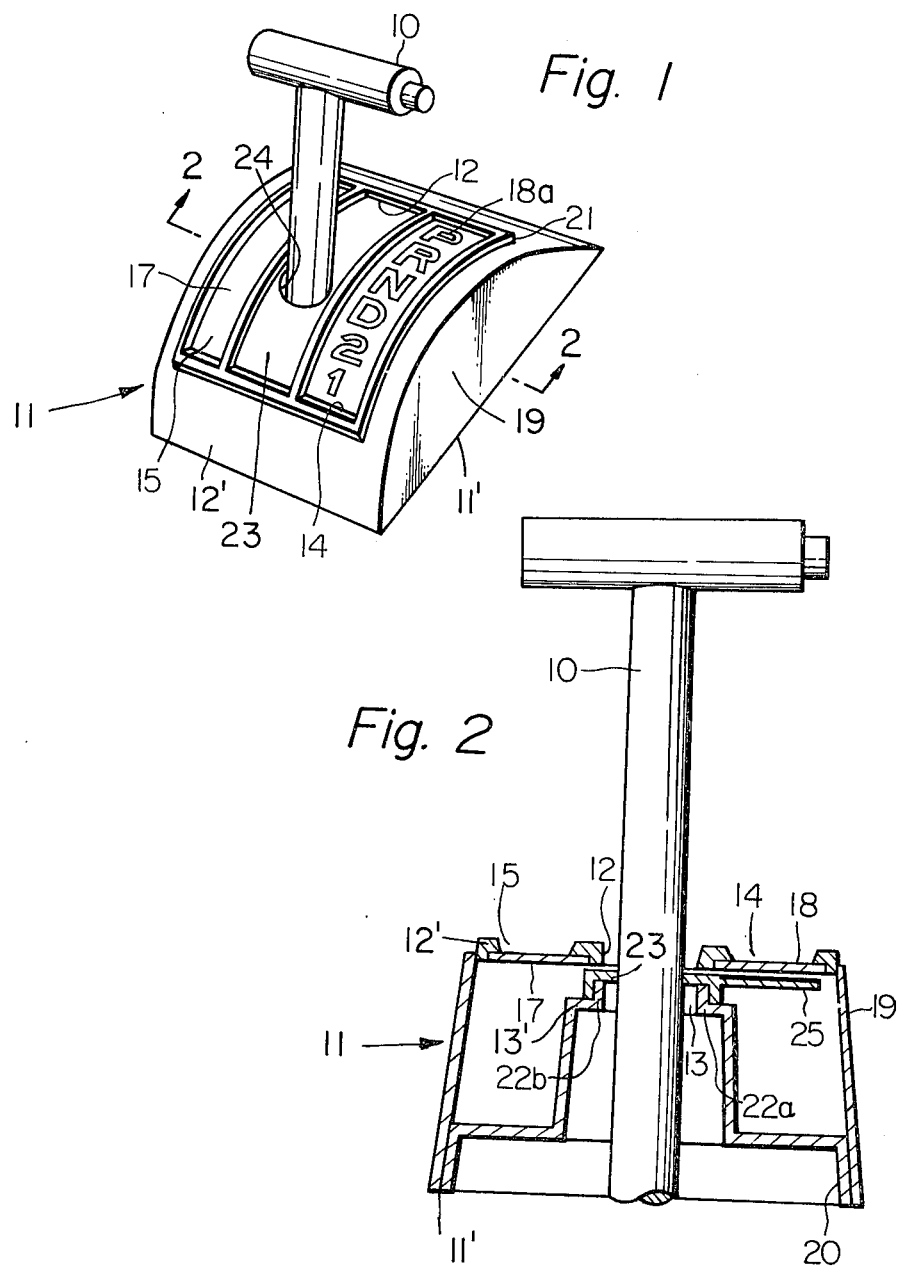

SELECTOR LEVER POSITION INDICATOR FOR MOTOR VEHICLE AUTOMATIC TRANSMISSION SYSTEM

BACKGROUND OF THE INVENTION

The present invention relates to motor vehicle automatic transmission systems and more particularly to a selector lever position indicator for a motor vehicle automatic transmission system.

The selector lever position indicator is so arranged as to indicate the control position of the selector lever which is connected to the manual selector valve spool. The control positions of the selector lever respectively correspond to the driving ranges such as parking (P), reverse (R), neutral (N), drive (D), second speed (2) and first speed (1) ranges.

The conventional selector lever position indicator includes an indicating member movable along indicating figures, such as P, N, D, 1 and 2 arranged in order, in accordance with movement of the selector lever.

It has been a problem in the conventional selector lever indicator that the indication by the indicator cannot be detected by the operator when it is dark in the vehicle cabin. It has been another problem that since the conventional shift lever position indicator is asymmetric, it is necessary to devise at least two types of position indicators so as to make them applicable to different types of vehicle cabins in one of which the steering wheel is positioned right-hand and in the other of which the steering wheel is positioned left-hand of the cabin.

SUMMARY OF THE INVENTION

It is accordingly a principal object of the present invention to provide a new and improved selector lever position indicator which can notify the operator of the shift lever position without illumination of the vehicle cabin, and which is adaptable to both types of vehicle cabins having the steering wheel positioned left-hand and right-hand. For this purpose the invention provides a shift lever casing with two uniform windows, on two sides of a central shift lever slot, and with two uniform plates fitted into these windows, one of them being opaque and the other patterned.

BRIEF DESCRIPTION OF THE DRAWING

The features and advantages of the selector lever position indicator of the present invention will become more apparent from the following description taken in conjunction with the accompanying drawings in which like reference numerals and characters designate corresponding parts throughout the figures and in which:

FIG. 1 is a perspective view of a selector lever position indicator according to the present invention;

FIG. 2 is a sectional view taken along the line 2—2 shown in FIG. 1; and

DESCRIPTION OF THE PREFERRED EMBODIMENT

Figure 3:
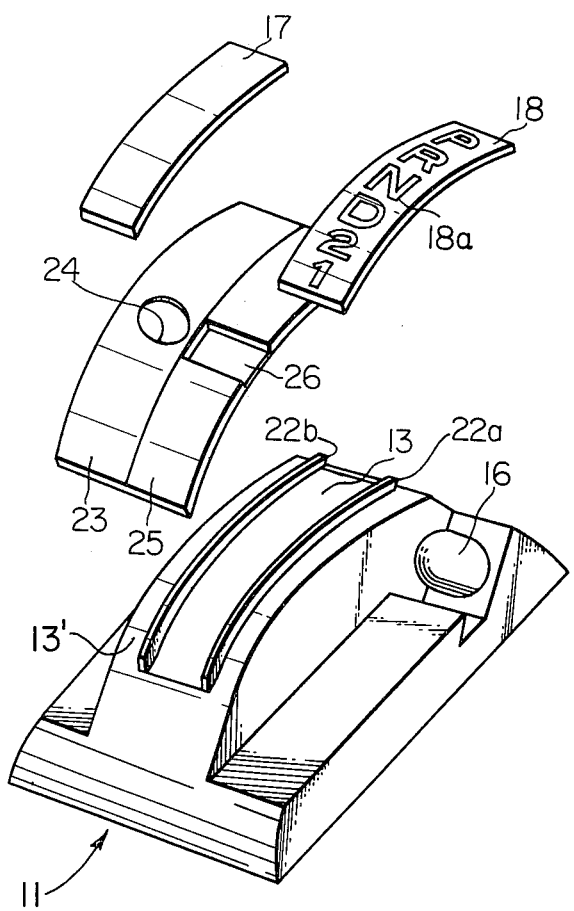
FIG. 3 is an exploded, perspective diagram showing various parts of the selector lever position indicator of FIG. 1.

Referring now to the accompanying drawings, there will be seen a selector lever position indicator according to the present invention which comprises a shift lever 10 connected through a suitable mechanical linkage (not shown) to the manual selector mechanism, also known as valve (not shown) of the automatic transmission system, so that the range of the automatic transmission system is selected by positioning the shift lever 10. A casing 11 is coupled with the shift lever 10 through central slots 12 and 13 coextensively formed in curved, upper and lower walls 12', 13' of the casing. The casing 11 has a flat bottom 11' whereby it is adapted to be mounted onto the wall of the vehicle cabin so that the shift lever 10 moves through the central slots 12 and 13. The casing 11 further has in the upper wall a pair of elongated side windows 14 and 15 extending along the central slot 12 and symmetric to each other with respect to the central slot 12. A lamp 16 is mounted on a suitable portion of the bottom wall of the casing 11 and is connected to an electric power source (not shown) through a suitable switching circuit (not shown). The lamp 16 is desirably energized through switching operation of the switching circuit. An opaque plate member 17 is snugly fitted into the side window 15, covering this window so as to blind light rays emitted from the lamp 16. An opaque patterned plate member 18 is snugly fitted into the side window 14, covering it, the patterned plate member 18 having transparent indicating portions 18a so shaped as to represent characters such as P, R, N, D, 2 and 1. The casing 11 preferably has outer and inner lateral plate members 19 and 20 snugly coupled with each other for example by friction as indicated by the drawing. The central slot 12 and side windows 14 and 15 are preferably defined by frame elements 21 fitted onto the upper wall 12' of the casing. A pair of guide rails 22a and 22b are formed at longitudinal edge portions of the central slot 13 in the lower wall 13'. An elongated slide member 23 is slidably mounted on the guide rails 22a and 22b, the slide member 23 being slidable along the longitudinal direction of the central slot 13 and having a length about twice as long as that of the central slot 13. The slide member 23 has an opening 24 at its central portion into which the selector lever 10 is inserted. An elongated translucent indicating member 25 rigidly secured to and is preferably integral with the slide member 24 and has a colored aperture portion 26 at its central portion. The colored aperture portion 26 has such an area as to allow chromatic light rays passed therethrough to be irradiated onto one of the transparent indicating portions 18a. The translucent indicating member 25 is preferably colored in white and the aperture portion 26 is red. Further, the inner surface of the casing 11 is preferably colored in white so as to effectively utilize light rays emitted from the lamp 16.

When, with the above-mentioned arrangement, the shift lever 10 is moved, the slide member 23 together with the indicating member 25 slides on the guide rails in accordance with movement of the shift lever 10, whereby the aperture portion 26 is positioned beneath one indicating portion 18a corresponding to a selected driving range. Since the aperture portion 26 is colored in, for example, red and the remaining portion of the indicating member 25 is colored in, for example, white, the indicating portion overlying the aperture portion 26 can be distinguished from the remaining indicating portions when it is light in the vehicle cabin.

When it is dark in the vehicle cabin, the lamp 16 is to be energized so that the lamp 16 emits light rays, only a red component of which passes through the aperture portion 26 and brightens the indicating portion overlying the aperture portion 26. The remaining indicating portions are brightened in white due to the light rays passed through the remaining white portion of the indicating member 25.

It should be appreciated that the shift lever position indicator according to the invention can clearly indicate the position of the shift lever 10, with and without electric illumination of in the vehicle cabin. The opaque plate member 17 and the patterned plate member 18 have the same dimensions and accordingly are replaceable by each other. Therefore the shift lever position indicator of the invention can be applied to a vehicle cabin wherein the steering wheel is positioned either right-hand or left-hand, by merely replacing the opaque and patterned plate members 17 and 18. This is easily done, after uncoupling the outer and inner members 19 and 20.

It will be understood that the invention is not to be limited to the exact construction shown and described and that various changes and modifications may be made without departing from the spirit and scope of the invention, as defined in the appended claims.

What is claimed is:

1. A shift lever position indicator for a motor vehicle transmission, comprising;

a casing disposed to be mounted on a floor wall of a motor vehicle thereof, the casing having an upper curved wall having a first central slot, and a pair of windows having identical dimensions and being symmetrical to one another with respect to and on opposite sides of said first central slot, a lower curved wall in the casing having a second central slot, coextensive with said first central slot, the slots enabling a shift lever to extend therethrough and to be moved along the slots for positioning a motor vehicle transmission system;

an opaque plate member normally snugly fitted into one of the windows;

a patterned plate member normally snugly fitted into the other window and having transparent indicating pattern portions, each contoured to represent a position of the lever and transmission system, the opaque and patterned plate members having identical dimensions to enable each to be interchangeably snugly fitted into either of the two windows;

a light source within the casing, beneath the patterned plate member;

guide means on the lower wall extending along the second central slot;

a curved slide member having an opening in a central portion thereof disposed to receive a shift lever and slidably mounted in the guide means to enable positioning of the slide member by a shift lever; and a translucent indicating member rigidly secured to the slide member, overlying said source, underlying said patterned plate member, having a distinctively light-transmissive portion juxtaposed with said opening of the slide member, said portion having such extent, longitudinally of the indicating member, as to coincide with one of the transparent pattern portions in each position of the slide member and indicating member.

* * * * *